United States Patent
Dorwin et al.

(10) Patent No.: US 11,604,856 B2
(45) Date of Patent: *Mar. 14, 2023

(54) SYSTEMS, METHODS, AND MEDIA FOR MEDIA SESSION CONCURRENCY MANAGEMENT WITH RECURRING LICENSE RENEWALS

(71) Applicant: Google LLC, Mountain View, CA (US)

(72) Inventors: David Kimbal Dorwin, Seattle, WA (US); Thomas William Inskip, Seattle, WA (US); Mark David Scott, Kirkland, WA (US)

(73) Assignee: Google LLC, Mountain View, CA (US)

( * ) Notice: Subject to any disclaimer, the term of this patent is extended or adjusted under 35 U.S.C. 154(b) by 459 days.

This patent is subject to a terminal disclaimer.

(21) Appl. No.: 16/780,347

(22) Filed: Feb. 3, 2020

(65) Prior Publication Data

US 2020/0184040 A1 Jun. 11, 2020

Related U.S. Application Data

(63) Continuation of application No. 16/266,561, filed on Feb. 4, 2019, now Pat. No. 10,552,587, which is a
(Continued)

(51) Int. Cl.
*G06F 21/10* (2013.01)
*G06F 16/78* (2019.01)
*G06F 16/9535* (2019.01)

(52) U.S. Cl.
CPC ........ *G06F 21/105* (2013.01); *G06F 16/7867* (2019.01); *G06F 16/9535* (2019.01); *G06F 21/10* (2013.01); *G06F 2221/0773* (2013.01)

(58) Field of Classification Search
CPC .............. G06F 21/10; G06F 21/105; G06F 2221/0773; G06F 16/7867; G06F 16/9535
See application file for complete search history.

(56) References Cited

U.S. PATENT DOCUMENTS 6,499,110 B1 * 12/2002 Moses ................... G06F 21/602
726/1
7,788,181 B2 8/2010 Ben-Menahem et al.
(Continued)

FOREIGN PATENT DOCUMENTS

CN 101369303 2/2009
CN 101533453 9/2009
(Continued)

OTHER PUBLICATIONS

NPL Search Terms (Year: 2022).*
(Continued)

*Primary Examiner* — Syed A Zaidi
(74) *Attorney, Agent, or Firm* — Kilpatrick Towsend & Stockton LLP

(57) ABSTRACT

The disclosed subject matter relates to systems, methods, and media for media session concurrency management with recurring license renewals. More particularly, the disclosed subject matter relates to using recurring license renewals for concurrent playback detection and concurrency limit enforcement for video delivery services and managing server resources for handling such recurring license renewals.

27 Claims, 5 Drawing Sheets

Related U.S. Application Data continuation of application No. 15/213,624, filed on Jul. 19, 2016, now Pat. No. 10,198,561.

(60) Provisional application No. 62/199,211, filed on Jul. 30, 2015, provisional application No. 62/194,804, filed on Jul. 20, 2015.

(56) References Cited

U.S. PATENT DOCUMENTS

| | | | |
|---|---|---|---|
| 8,239,546 B1 | 8/2012 | McGowan | |
| 8,949,605 B2 | 2/2015 | Nakano | |
| 2001/0034712 A1* | 10/2001 | Colvin | G06F 21/121 705/52 |
| 2002/0107809 A1* | 8/2002 | Biddle | G06F 21/10 705/59 |
| 2002/0131594 A1 | 9/2002 | Hori et al. | |
| 2003/0232616 A1* | 12/2003 | Gidron | H04M 15/00 455/406 |
| 2004/0167859 A1* | 8/2004 | Mirabella | G06Q 30/04 705/59 |
| 2005/0028153 A1* | 2/2005 | Anderson | G06Q 99/00 717/174 |
| 2005/0160049 A1* | 7/2005 | Lundholm | G06F 21/105 705/59 |
| 2005/0289072 A1* | 12/2005 | Sabharwal | G06F 21/121 705/59 |
| 2006/0083205 A1* | 4/2006 | Buddhikot | H04W 28/16 370/338 |
| 2006/0085648 A1 | 4/2006 | Cheston et al. | |
| 2007/0150418 A1 | 6/2007 | Ben-Menahem et al. | |
| 2009/0089864 A1* | 4/2009 | Tyrrell | H04L 63/10 726/6 |
| 2009/0254482 A1* | 10/2009 | Vadlamani | G06F 21/10 705/59 |
| 2010/0004938 A1* | 1/2010 | Sundstrom | 705/1.1 |
| 2010/0061549 A1* | 3/2010 | Seo | H04N 21/4627 380/42 |
| 2010/0325417 A1 | 12/2010 | Swenson et al. | |
| 2011/0113428 A1* | 5/2011 | Nelson | G06F 13/42 718/1 |
| 2012/0166796 A1 | 6/2012 | Metke et al. | |
| 2013/0130653 A1* | 5/2013 | Deasy | G06F 9/45558 455/410 |
| 2013/0160145 A1 | 6/2013 | Henzie et al. | |
| 2014/0189346 A1 | 7/2014 | Cureton | |
| 2015/0128165 A1 | 5/2015 | Matuchniak et al. | |

FOREIGN PATENT DOCUMENTS

| | | |
|---|---|---|
| CN | 101889438 | 11/2010 |
| CN | 102340521 | 2/2012 |
| CN | 102546660 | 7/2012 |
| CN | 103164811 | 6/2013 |
| CN | 104427358 | 3/2015 |
| EP | 2605168 | 6/2013 |
| JP | 2003108252 | 4/2003 |
| JP | 2005197804 | 7/2005 |
| JP | 2012034142 | 2/2012 |
| JP | 2013137741 | 7/2013 |
| JP | 2014115883 | 6/2014 |
| JP | 6522801 | 5/2019 |
| KR | 1020130085931 | 7/2013 |

OTHER PUBLICATIONS

International Search Report and Written Opinion dated Oct. 11, 2016 in International Patent Application No. PCT/US2016/042976.
Notice of Allowance dated Mar. 26, 2019 in JP Patent Application No. 2017-564887.
Notice of Allowance dated Sep. 21, 2018 in U.S. Appl. No. 15/213,624.
Notice of Allowance dated Sep. 25, 2019 in U.S. Appl. No. 16/266,561.
Office Action dated Feb. 19, 2019 in KR Patent Application No. 10-2017-7036286.
Office Action dated Apr. 5, 2018 in U.S. Appl. No. 15/213,624.
Office Action dated Jun. 10, 2019 in U.S. Appl. No. 16/266,561.
Examination Report dated Mar. 30, 2021 in IN Patent Application No. 201747042446.
Examination Report dated Apr. 6, 2021 in GB Patent Application No. 1719826.8.
Examination Report dated Sep. 16, 2021 in DE Patent Application No. 11 2016 003 268.4.
Office Action dated Feb. 2, 2021 in CN Patent Application No. 201680034890.5.
Office Action dated Apr. 18, 2022 in CN Patent Application No. 202111169949.0.
Office Action dated Jun. 30, 2020 in JP Patent Application No. 2019-082970.

* cited by examiner

SYSTEMS, METHODS, AND MEDIA FOR MEDIA SESSION CONCURRENCY MANAGEMENT WITH RECURRING LICENSE RENEWALS

CROSS-REFERENCE TO RELATED APPLICATIONS

This application is a continuation of U.S. patent application Ser. No. 16/266,561, filed Feb. 4, 2019, which is a continuation of U.S. patent application Ser. No. 15/213,624, filed Jul. 19, 2016, which claims the benefit of U.S. Provisional Patent Application No. 62/194,804, filed Jul. 20, 2015, and U.S. Provisional Patent Application No. 62/199,211, filed Jul. 30, 2015, each of which is hereby incorporated by reference herein in its entirety.

TECHNICAL FIELD

The disclosed subject matter relates to systems, methods, and media for media session concurrency management with recurring license renewals. More particularly, the disclosed subject matter relates to using recurring license renewals for concurrent playback detection and concurrency limit enforcement for video delivery services and managing server resources for handling such recurring license renewals.

BACKGROUND

Movies, music, and other forms of media content are provided to computing devices over the Internet from a variety of content providers. For a number of reasons, some of this content is protected in which a license that at least identifies various rights to use, play, copy, and/or distribute the associated media content is required. Other protections may include various levels or types of encryption protection that may necessitate a key in order to decrypt the media content.

Moreover, a limit may be placed on the number of concurrent streaming connections that a particular user is allowed to establish. That is, the number of devices, which are each authenticated with the same user account, on which media content can be simultaneously streamed and watched can be limited (e.g., two total connections per user account, three connections per user account across four devices, etc.). To enforce such a limit, when a user requests a new streaming connection, the number of currently established streaming connections associated with that user is detected and, if that number exceeds the maximum number of allowed concurrent streaming connections, then the request for the new streaming connection can be denied. Managing the enforcement of policies including this limit is a difficult task.

Various approaches attempt to address the issue of concurrency limit enforcement by requiring that a client device associated with the particular user transmit a message to a server when the particular user has stopped watching a piece of media content. However, such approaches can constrain client implementation and device architecture and can require persistent storage on the client device. That is, these approaches place the dependency of concurrently limit enforcement on each and every client device. In addition, these approaches are generally considered to be not reliable because the client device can stop playback in a "disorderly" manner due to device failure (crash), power failure, network failure, etc.

Accordingly, it is desirable to provide new systems, methods, and media for media session concurrency management with recurring license renewals.

SUMMARY

In accordance with some implementations of the disclosed subject matter, mechanisms for media session concurrency management with recurring license renewals are provided.

In accordance with some implementations, a system for concurrency detection and enforcement is provided, the system comprising at least one server that is configured to: receive a request for a media content license pertaining to a media content item to be presented on a media playback device, wherein the request for the media content license is associated with a user account; in response to the request for the media content license, transmit, to the media playback device, one or more keys associated with the media content item and a license comprising a policy including a limited license duration and a renewal request interval; receive, at a time within the renewal request interval, a request for a license renewal pertaining to the media content item being presented on the media playback device; determine whether to issue the license renewal for the media content item based on media session concurrency across a plurality of media playback devices associated with the user account, wherein the determination includes querying a record of license renewals issued during a given time period for the user account; and transmit the license renewal to the media playback device based on the record of license renewals associated with the user account.

In some implementations, the at least one server is further configured to modify at least one of the limited license duration and the renewal request interval. In some implementations, the modification is performed in response to reviewing the record of license renewals issued during a given time period for the user account and determining that the record of license renewals indicates suppression of license renewal requests by the plurality of media playback devices associated with the user account. In some implementations, the modification is performed in response to detecting a server outage.

In some implementations, in response to determining that the one or more keys in the license are to be revoked, the limited license duration associated with the license renewal has a zero duration or some other means to enforce discontinuation of media rights.

In some implementations, the at least one server is further configured to automatically transmit the license of the limited license duration for the media content item to the media playback device while concurrently indicating a previously issued license within the record for discontinuation.

In some implementations, the at least one server is further configured to: review the record of license renewals issued during the given time period for the user account; determine an enforcement mode from a plurality of enforcement modes to apply to the user account; and apply the determined enforcement mode when issuing the license renewal, wherein at least one of the limited license duration and the renewal request interval is adjusted.

In some implementations, the at least one server is further configured to transmit, to a media playback application executing on the media playback device, a list of a plurality of license servers for handling the request for the license renewal, wherein the media playback application transmits the request for the license renewal to a first license server of the plurality of license servers and, upon detecting that the first license server is unavailable and prior to the expiration of the license, transmits the request to a second license server of the plurality of license servers until the license renewal for the media content license is received.

In some implementations, the at least one server is further configured to: determine whether to issue the license renewal by counting the number of license renewals associated with the user account within the given time period; and transmit the license renewal to the media playback device based on the count.

In some implementations, the at least one server is further configured to determine whether to enter an emergency renewal mode that automatically issues the license renewal in response to being unable to access the record of license renewals. In some implementations, the emergency renewal mode is entered based on resource information associated with one or more servers that service an initial license request or service a renewal request. In some implementations, the license renewal includes a second license duration that is greater than the first license duration. In some implementations, the emergency renewal mode is entered in response to a number of failures to communicate with a server is greater than a threshold value and wherein the hardware processor is further configured to transmit the license renewal to an alternate server servicing an initial license request or servicing a renewal request. In some implementations, the system further comprises determining whether to enter a renewal-only mode that issues the license renewal in response to detecting that a server configured to service an initial license request is unavailable.

In accordance with some implementations, a system for concurrency detection and enforcement is provided, the system comprising at least one server that includes a hardware processor that is configured to: receive a request from a media playback device associated with a user account for an initial license corresponding to a media content item; place the user account in a detection mode that sets an initial license duration and an initial license renewal interval for the initial license; transmit the initial license to the media playback device, wherein the initial license has the initial license duration and the initial license renewal interval; determine whether the user account is associated with suspicious behavior that indicates renewal request suppression; place the user account in a stricter enforcement mode that sets a renewal license duration that is less than the initial license duration or a license renewal interval that is less than the initial license renewal interval; and transmit a license renewal to the media playback device, wherein the license renewal has at least one of the renewal license duration and the license renewal interval.

In some implementations, the initial license duration is greater than a content duration of the media content item. In some implementations, at least one of the initial license duration and the renewal license duration is less than the content duration of the media content item. In some implementations, the renewal license duration is a predetermined period of time that is less than half of the content duration of the media content item. In some implementations, the license renewal interval less than the initial renewal interval.

In some implementations, determining whether the user account is associated with suspicious behavior further comprises detecting that the user account generates a plurality of license requests across a plurality of media playback devices associated with the user account.

In some implementations, determining whether the user account is associated with suspicious behavior further comprises detecting that the user account generates no license renewal requests within a particular time period.

In some implementations, determining whether the user account is associated with suspicious behavior further comprises detecting that the user account generates a plurality of license requests for the same media content item on the same media playback device.

In some implementations, determining whether the user account is associated with suspicious behavior further comprises detecting a suspicious renewal request, wherein a time associated with the suspicious renewal request is proximal to the initial license duration than the initial renewal interval.

In some implementations, the system further comprises, in response to a particular time period elapsing, placing the user account in an enforcement mode that is less restrictive than the stricter enforcement mode.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
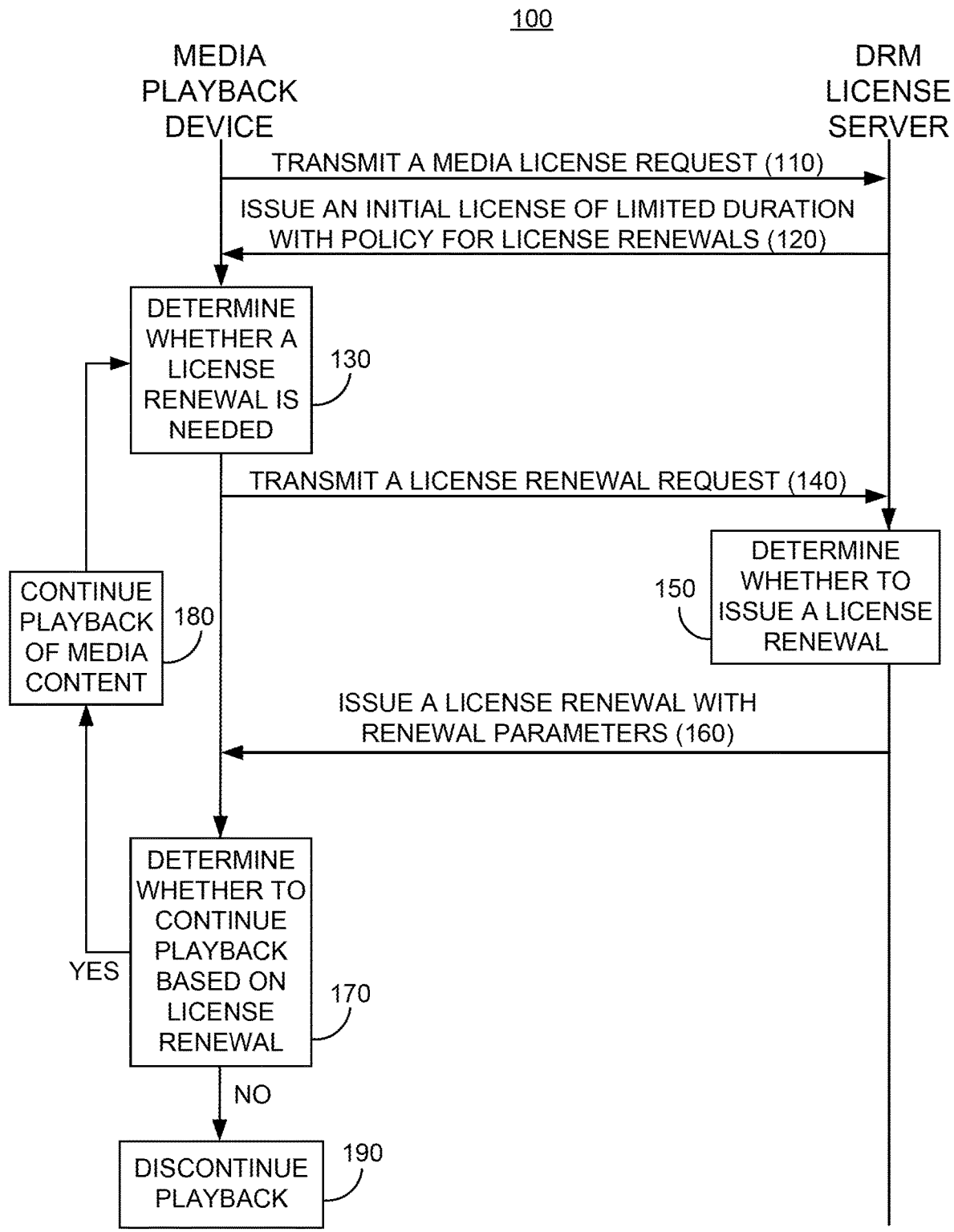
FIG. 1 shows an illustrative example of a data flow including the requests and responses between a media playback device and one or more license serves in accordance with some implementations of the disclosed subject matter.

In accordance with various implementations, mechanisms (which include systems, methods, and media) for media session concurrency management with recurring license renewals are provided.

Generally speaking, content distribution systems can include a content server, a media playback application executing on a computing device, and a communications network that connects the content server to the media playback application executing on the computing device. The content server can be configured to store media content items that can be downloaded from the content server to the media playback application executing on the computing device. For example, in response to receiving a user request that selects a title or any other suitable information identifying a media content item, the media playback application executing on the computing device can be configured to download and playback a media file corresponding to the media content item, which can include sequential content data, audio data, video data, etc. Such playback can include decoding and rendering audio data and video data into an audio signal and a video signal. In some implementations, the content server sequentially transmits or streams the media file(s) to the media playback application. Accordingly, the media playback application executing on the computing device can present a portion of the media content item using the media file(s) while one or more additional media files of the media content item are obtained.

In some situations, a limit can be placed on the number of concurrent streaming connections that a particular user account is allowed to establish. For example, based on a particular account and/or a particular type of device, a content provider can place a restriction on the maximum number of concurrent streaming connections that can be established for that account or that device. Enforcement of the limit on the number of concurrent streaming connections can be performed herein by any suitable server, such as a digital rights management (DRM) server. When a user of a particular user account requests a new streaming connection, a media license can be needed in addition to the media content. The DRM server can determine whether to issue the media license to the device requesting a new streaming connection by, at least in part, detecting the number of currently active or established streaming connections associated with that user account, and, if that number exceeds a maximum number of allowed concurrent streaming connections, denying the request for the new streaming connection. It should be noted that denial of such license renders the media content unplayable or otherwise inhibits the media content from being played back.

It should also be noted that, in some situations, a previous streaming connection that has been established by a user of a user account is terminated by the media playback application but the notification of the termination event is not received by the license server. This can result in inaccurate or stale state information being stored on the DRM server related to the user account, which may impact the viewing experience of the user associated with the user account. For example, a user of a user account who has legitimately terminated a particular streaming connection may not be allowed to establish any new streaming connections if the DRM server does not know that the particular streaming connection has been terminated. Not allowing users to establish new streaming connections when those users are in compliance with the limitations placed on concurrent streaming connections can ruin the user experience and is, thus, undesirable in such a content distribution system.

The DRM server can, in response to receiving a media license request from a DRM client device for a new license, respond with a license of limited duration. For example, the license can have a limited duration on the order of a few minutes (e.g., five minutes) and can be associated with a policy that allows for license renewals. It should be noted that, the license can be key system-specific state information that includes one or more keys, which can each be associated with a key identifier, and any other suitable information regarding key usage. It should also be noted that the one or more keys included in the license may not be usable for decryption of media content (e.g., one or more blocks of media data) if the license has expired.

Prior to the expiration of the license on the DRM client device, the DRM client device can issue a license renewal request in accordance with the license renewal policy. For example, the license renewal policy can indicate a renewal request interval (or the time between license renewal requests) and license duration. It should be noted that the license renewal policy can be adjusted dynamically based on any suitable parameter (e.g., per account, per device, per media content title, etc.), where the adjustments can include increased license periods during times of server overload or data center outages, increased license periods for user accounts that are deemed to exhibit a particular type of behavior, more frequent renewal request intervals for user accounts that are deemed to exhibit a particular type of behavior, etc. It should also be noted that the license renewal request can be repeated if a license renewal is not received after a particular timeout period.

In response to receiving the license renewal request from the DRM client device, the DRM server can determine whether to extend the license for another license renewal period or to discontinue key usage rights. The license renewal can, for example, be generally lighter than the initial license as containing policy data indicating to extend or revoke usage of the media keys (e.g., while a license can include the one or more media keys). It should be noted that the discontinuation or revocation of the usage of the media keys can be performed by, for example, transmitting a license renewal of zero duration or some other means to enforce discontinuation of media rights.

Accordingly, in response to receiving the license renewal, the DRM client device can be configured to extend the license by the amount prescribed in the license renewal or revoke access to the media keys, thereby terminating playback of the media content item.

With regard to detecting concurrent streaming connections, the DRM server can determine how many DRM client devices are accessing a particular media content item (or, in general, the media service) by counting the number of license renewal requests that were received in the last renewal period for a user account and/or a media content item. It should be noted that, if the DRM server has not received a request from DRM client instance within the last renewal period, the DRM server may assume that the DRM client device is no longer playing back the media content item. For example, the user of the DRM client device may have discontinued playback of the media content item. In another example, the key usage rights may have been revoked or discontinued due to license expiration.

In some implementations, the DRM server or any other suitable server that services license renewal requests can maintain a queue of license renewal requests in which old entries in the queue can expire after a time equivalent to the license duration. The DRM server can determine whether to issue an initial license in response to a new initial license request by checking the queue (e.g., a license-renewal server queue) to determine concurrent ongoing playback sessions. Alternatively, the DRM server can be configured to always service new requests while causing the DRM server or any other suitable renewal server to discontinue license rights for the oldest session next time a license renewal request is received for the session. This has the advantage of, for example, always granting the most recent user request as opposed to denying a new request because other playback sessions are believed to be in progress.

In some implementations, additionally or alternatively, the DRM server can be configured to implement a detection-only enforcement mode in which license servers that handle the initial license request and license renewal servers that handle the license renewal requests can service and log the received requests in a record.

These mechanisms described herein can be used in a variety of applications. For example, these mechanisms can be used to detect and contain users displaying suspicious behavior without impacting or affecting media delivery services to users that do not exhibit such suspicious behavior. In another example, these mechanisms can be scaled across different types and numbers of clients as it is independent of client architecture, may not require storage (e.g., JavaScript storage) in client devices, and may be implemented to operate in private browsing modes. In a more particular example, these mechanisms may not constrain client device implementation or client device architecture, where a client device that can request and handle licenses can support the use of recurring license renewals. In yet another example, these mechanisms can provide flexibility as threats escalate or de-escalate. In a further example, these mechanisms can be used to provide a single implementation that detects fraud and enforces concurrency limits.

In a more particular example, the lack of a license renewal request being received before the expiration of a license can be used as an indication that the media content is no longer being played. Because of this, such indications may not be lost due to device crashes, lid closures on laptop computing device, etc.

These and other features of media session concurrency management with recurring license renewals are further described in connection with FIGS. 1-5.

Turning to FIG. 1, an illustrative example of a flow diagram 100 for implementing recurring license renewals between a media playback device and one or more DRM or license servers is shown in accordance with some implementations of the disclosed subject matter. For example, a media playback device can transmit requests for licenses and license renewals to a DRM server, where the DRM server handles the determination of whether to issue licenses and license renewals. It should be noted that, although FIG. 1 shows one DRM license server, any suitable number of DRM license servers can be used. For example, a media playback device can transmit requests for licenses to a license server and requests for license renewals to one or more license renewal servers. In another example, a server, such as a web server, can handle requests for licenses or license renewals and determine which license server should handle a license request and which license renewal server should handle a license renewal request. In yet another example, in response to the DRM client not receiving a response to a license request or a license renewal request within a particular period of time (e.g., a predetermined timeout), the DRM client can be configured to transmit another license request or license renewal request to another DRM license server.

As described hereinbelow, it should be noted that each license renewal can be used to indicate that the connection for streaming a particular media content item remains active. This can be used to, for example, determine the number of active streaming connections and compare the determined number of active streaming connections with a concurrency limit when determining whether to issue another license or license renewal.

In some implementations, process 100 can begin at 110 by receiving a request for a media content license pertaining to a media content item for presentation on a media playback device. For example, in response to requesting a media content item from a content server (e.g., to stream a media content item), a DRM client can receive encrypted media data that, when decrypted with a media license containing one or more keys, plays back the media content item on the DRM client. The request for a media content license can include, for example, metadata associated with the media content item, such as title information, video format information, resolution or bit rate, aspect ratio, length information, audio format information, subtitle information, etc. In another example, the request for a media content license can include user credential information, such as a user name and a password associated with a user account, and device information, such as a device identifier, device type information, connection information, etc.

In some implementations, the DRM license server can determine whether to service to the license request from the DRM client device. For example, the DRM license server can detect a number of concurrent streaming connections associated with a user account from any suitable number of DRM client devices by counting the number of license renewal requests that were received in the last renewal period for a user account. In continuing this example, if the DRM license server has not received a renewal request from a DRM client instance within the last renewal period, the DRM license server can use such information as an indication that the DRM client device is no longer playing back the media content item—e.g., the user of the DRM client device may have discontinued playback of the media content item, the key usage rights may have been revoked or discontinued due to license expiration, etc.

In some implementations, the DRM license server can detect the number of concurrent streaming connections by maintaining a queue of license renewal requests in which the old entries in the queue can expire after a time equivalent to the license duration. Accordingly, the DRM license server can determine whether to issue an initial license in response to a new initial license request by checking the queue (e.g., a license-renewal server queue) to determine concurrent ongoing playback sessions.

It should be noted that any suitable information can be obtained that assists the DRM license server in determining how to respond to a new initial license request from a user device authenticated with a particular user account. For example, in implementations that include a DRM license server that handle license requests and one or more license renewal servers that handle license renewal requests and maintain a license renewal queue, such information can include the number of active sessions, the number of license renewal requests, the number of license renewals, timing information associated with the license renewal requests, device information associated with the license renewal requests, license information, a suitable response given a maximum number of allowable concurrent sessions, the number of concurrent sessions that remain available for a user account, etc.

Alternatively, the DRM license server can be configured to always service new requests while causing the DRM license server or any other suitable renewal server to discontinue license rights for the oldest session next time a license renewal request is received for the session. This can be advantageous, for example, to always grant the most recent user request as opposed to denying a new request because other playback sessions are believed to be in progress.

Referring back to FIG. 1, in some implementations, at 120, in response to the received request for a media license from a DRM client device, a DRM license server can transmit a response that includes a license of limited duration. For example, using the metadata or other information from the request transmitted by the DRM client device, the DRM license server can locate and obtain one or more keys associated with the media data to be decrypted and include the one or more keys into the license of limited duration. In a more particular example, the license issued by the DRM license server can be key system-specific state information that includes one or more keys, which can each be associated with a key identifier, and any other suitable information regarding key usage.

It should be noted that the duration of such a license can be, for example, a given number of minutes (e.g., three minutes, five minutes, etc.). For example, the duration of the license can be made equivalent to the duration or overall playback length of the media content item. In another example, the duration of the license can be made equivalent to the duration of the media content item and an additional period of time for user interactions, such as pausing the playback of the media content item (e.g., content duration plus x number of minutes). In yet another example, the duration of the license can be set as a short period of time in comparison with the overall playback length of the media content item (e.g., five minute license durations for a media content item with a total playback duration of thirty minutes). It should also be noted that such a license can, in some implementations, be configured with a policy that sets a particular license period and allows for license renewals, where, prior to the expiration of the license, the DRM client device issues a license renewal request in order to maintain the media license and continue playing back the media content item. If the license has expired, the one or more keys included in the license may not be usable for decryption of media content (e.g., one or more blocks of media data).

In some implementations, the licenses issued by the DRM license server or the license renewal server (e.g., a suitable server that maintains an account of the license renewals) can be configured based on any suitable parameters. For example, a content provider can provide any suitable parameters that dynamically adjust the license period of a license for a particular user account, for a particular device, for a particular piece of media content, etc. Such parameters can cause adjustments of the license period in response to a determination of or receiving an indication of server overload (e.g., increasing the license period to alleviate use of server resources), data center outage (e.g., increasing the license period in response to detecting a data center outage), a user account deemed to be well-behaved or in good standing (e.g., increasing the license period for a particular user account in which there are no or few instances of detected suspicious behavior), a user account in which suspicious behavior has been detected (e.g., decreasing the license period and/or applying a different license policy that decreases or dynamically changes the number of concurrent sessions based on user behavior), conflict resolution (e.g., automatically granting an initial license or a license renewal for a user account deemed to be well-behaved in response to the server indicating that an abnormal situation exists), media type (e.g., longer movies receive shorter license periods as opposed to shorter audio clips), etc.

In some implementations, additionally or alternatively to allowing the license duration to be modified, the renewal request interval can also be modified based on any suitable parameters. For example, in response to a parameter that indicates the general behavior of a user account or a user device (e.g., well-behaved in having no instances of detected suspicious behavior, bad behavior in having a number of detections of suspicious behavior that is greater than a threshold value, undecided behavior in having a user account or a user device having behavior information that is less than a particular period of time, etc.), the renewal request interval can be modified based on the behavior parameter. In a more particular example, a server can issue a license having a renewal request interval of a default period (e.g., a longer renewal grace period of five minutes when compared to a shorter more restrictive renewal grace period of two minutes) and determine whether the renewal request interval in subsequent license requests should be decreased in response to behavior information associated with the user account or the user device. In this example, while an initial license request can receive a less restrictive license having a longer renewal request interval, such as every six minutes, a license renewal request can receive a more restrictive license renewal having a shorter renewal request interval, such as every two minutes, in response to detecting suspicious behavior (e.g., a number of license requests within a particular period of time that is greater than a particular threshold value). This can be used, for example, in response to determining that a user account has multiple new license requests while other licenses are valid, which may indicate that a user of the particular user account is abusing their account by concurrently streaming many pieces of media content and blocking renewal requests or legitimately perusing through various pieces of media content until finding media content that the user is interested in consuming.

It should be noted that any suitable approach can be used for setting the renewal request interval. For example, the server can associate a behavioral indication with each user account or each user device, where each behavioral indication is associated with a particular license duration and/or a particular renewal request interval. In response to receiving a behavioral indicator, the DRM license server can transmit the appropriate license in response to the received license request or license renewal request.

In some implementations, in cases in which license renewals are permitted for an issued license, the license can include information relating to one or more servers for handling license renewal requests (e.g., URLs for one or more license renewal servers). In some implementations, such information can include an ordered list of URLs of one or more license renewal servers—e.g., a URL for a first license renewal server and, if no response is received within a given timeout period, a URL for a second license renewal server, and so on. Alternatively, in some implementations, such information can include a URL of a first license renewal server and one or more fallback URLs of license renewal servers should the first license renewal server be unreachable within a particular period of time.

In some implementations, at 130, the DRM client can determine whether a license renewal for the currently issued license is needed. For example, in response to receiving the issued license at 120, the DRM client can determine that the license period is a particular period of time (e.g., five minutes) and that license renewals for the issued license are permitted at a particular license renewal request interval. In response to determining the license period, the DRM client can determine a particular time period in which a license renewal is to be obtained, such as two minutes prior to the expiration of the currently issued license (or a time that is well before the expiration of the currently issued license).

In a more particular example, the DRM client can determine that the policy associated with the issued license indicates a license duration and a renewal request interval (or the time between license renewal requests). For example, should a user desire to continue playing back the media content item by extending the currently issued license, the policy can instruct the DRM client that a particular license renewal window opens at a particular time—e.g., license renewal requests can be received from the DRM server within a renewal window that opens at least one minute prior to the expiration of the currently issued license. It should be noted that the license renewal policy can be adjusted dynamically by the DRM license server based on any suitable parameter (e.g., per account, per device, per media content title, etc.), where the adjustments can include increased license periods during times of server overload or data center outages, increased license periods for user accounts that are deemed to exhibit a particular type of behavior, more frequent renewal request intervals for user accounts that are deemed to exhibit a particular type of behavior, etc.

In some implementations, in response to determining that a license renewal is needed to continue playing back the media content item prior to the expiration of the currently issued license, the DRM client device can transmit a license renewal request at 140. The license renewal request can include any suitable information, such as a license identifier associated with the currently issued license, a session identifier associated with the currently active streaming connection, an amount of time prior to the expiration of the currently issued license, or any other suitable information from the DRM client device needed by the DRM license server to issue a license renewal. In some implementations, the license issued by the DRM license server can include instructions as to what information is needed to issue a license renewal for the currently issued license (e.g., user account information, license information, device information, timing information, or any suitable combination thereof).

In some implementations, if a response to the license renewal request is not received, the DRM client device can repeat the license renewal request to obtain a valid renewal any suitable number of times after a configured timeout. For example, a response to the license renewal request may not be received due to an outage of a particular license renewal server. In a more particular example, in response to transmitting a license renewal request to a license renewal server at a first URL, the DRM client device can transmit a subsequent license renewal request to another license renewal server at a fallback URL. The transmission of license renewal requests can continue to be transmitted to license renewal servers at fallback URLs until a license renewal is obtained.

At 150, in response to receiving the license renewal request from the DRM client device, the DRM license server can determine whether to issue a license renewal. For example, the DRM license server can determine whether to extend the license for another license renewal period or to discontinue key usage rights. It should be noted that the determination to issue a license renewal can include setting a license renewal duration (e.g., another three minutes, another five minutes, etc.) to continue the usage of the media keys, thereby allowing the media content item to continue being played back. It should also be noted that the discontinuation or revocation of the usage of the media keys in the license can be performed by, for example, transmitting a license renewal of zero duration or otherwise issue an instruction that terminates key usage rights.

In some implementations, as described above, the DRM license server can detect a number of concurrent streaming connections associated with a user account from any suitable number of DRM client devices by counting the number of license renewal requests that were received in the last renewal period for a user account. In continuing this example, if the DRM license server has not received a renewal request from a DRM client instance within the last renewal period, the DRM license server can use such information as an indication that the DRM client device is no longer playing back the media content item—e.g., the user of the DRM client device may have discontinued playback of the media content item, the key usage rights may have been revoked or discontinued due to license expiration, etc.

In some implementations, the DRM license server can detect the number of concurrent streaming connections by maintaining a queue of license renewal requests in which the old entries in the queue can expire after a time equivalent to the license duration. Accordingly, the DRM license server can determine whether to issue a license renewal in response to a license renewal request by checking the queue (e.g., a license-renewal server queue) to determine concurrent ongoing playback sessions.

It should be noted that, in implementations in which one or more license renewal servers handle license renewal requests, the license server can query a license renewal queue and determine information that can be used to handle the license renewal request, such as the number of active sessions, the number of license renewal requests, the number of license renewals, timing information associated with the license renewal requests, device information associated with the license renewal requests, license information, a suitable response given a maximum number of allowable concurrent sessions, the number of concurrent sessions that remain available for a user account, etc.

Alternatively, in some implementations, the DRM license server can implement a detection-only mode that causes the initial license request and/or license renewal requests to be automatically serviced and maintains a log of the requests and associated licenses and license renewals. This can be implemented, for example, during time periods of server overload, data center outages, etc.

In some implementations, it should be noted that the DRM license server can be configured to always service new renewal requests while causing the DRM license server or any other suitable renewal server to discontinue license rights for the oldest session next time a license renewal request is received for the session. In response to determining that the license renewal request corresponds with an older session in the queue that was designated for termination, the DRM license server can respond to the license renewal request with a license renewal having a zero duration or some other means to enforce discontinuation of media rights. This can be advantageous, for example, to always grant the most recent user request as opposed to denying a new request because other playback sessions are believed to be in progress.

At 160, a license renewal message having particular renewal parameters can be transmitted from the DRM license server to the DRM client device. The DRM client device can, at 170, determine whether playback of the media content item is permitted based on the received license renewal message. For example, as described above, in response to receiving the license renewal message, the DRM client device can extract the renewal parameters from the received license renewal message and determine that an extension to the license has been permitted for a particular duration (e.g., another short period of time that is the same as the license duration associated with the initial license, a short period of time that is less than the license duration associated with the initial license, etc.). The media playback item with the renewed license can continue being played back at 180. The DRM client device can return to 130, where it can be determined at a later time whether a license renewal is needed to continue playing back the media content item. For example, prior to the expiration of the renewed license (e.g., when a license renewal window has opened), the DRM client device can determine whether a license renewal is needed to continue playing back the media content item.

In another example, as described above, in response to receiving the license renewal message, extracting the renewal parameters from the received license renewal message, and determining that a license renewal of zero duration has been issued (or some other means to enforce discontinuation of media rights), the DRM client device can be revoked access to the keys, which terminates playback of the media content at 190.

In some implementations, different enforcement modes can be employed in connection with the disclosed subject matter. In an illustrative example in which license periods and renewal request intervals can be dynamically adjusted by the DRM license server, the DRM license server can make such adjustments to implement one of multiple enforcement modes.

Figure 2:
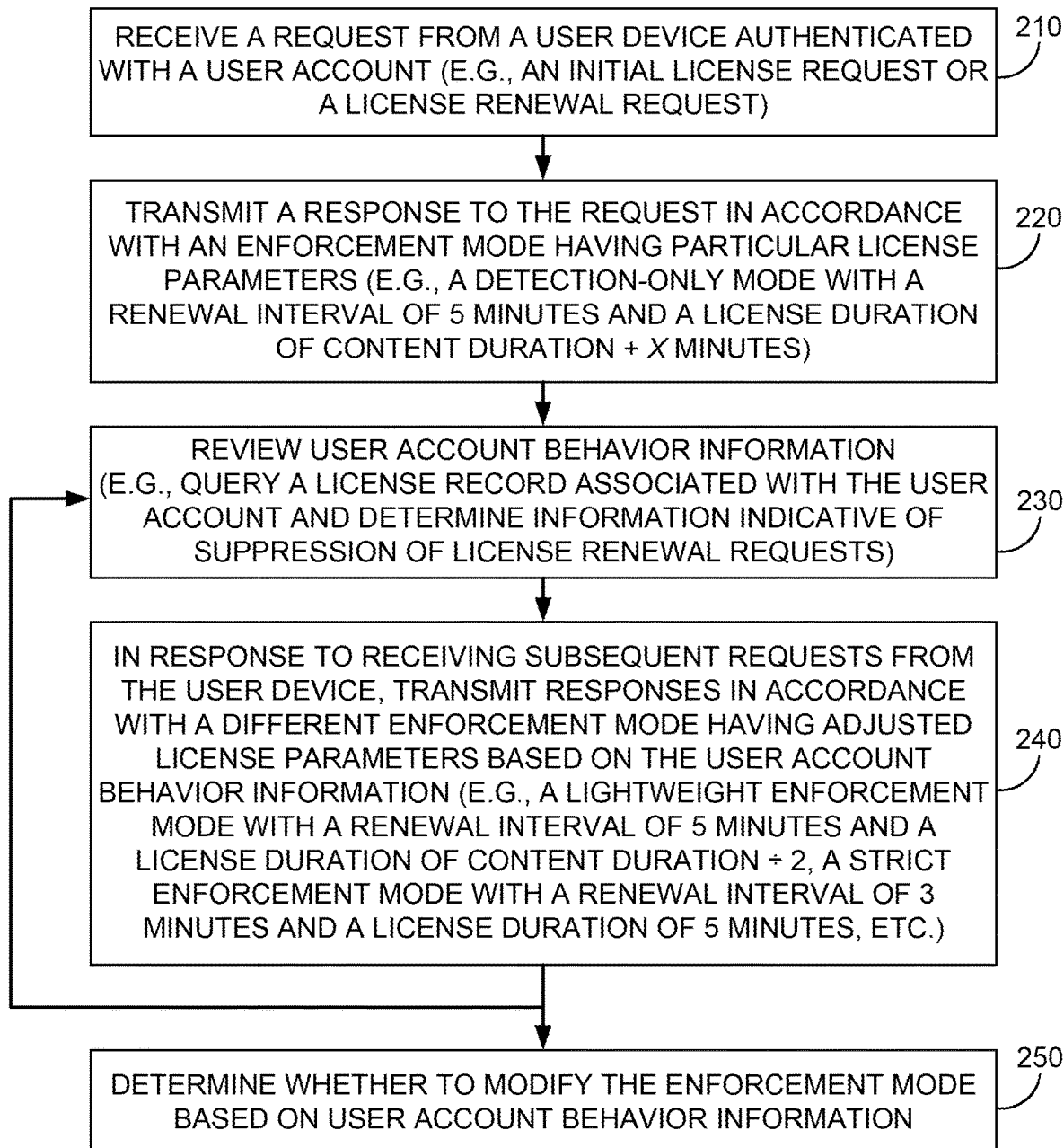
FIG. 2 shows an illustrative example of a process for media session concurrency management with recurring license renewals in accordance with some implementations of the disclosed subject matter.

Turning to FIG. 2, the DRM license server can begin process 200 at 210 by receiving a request from a user device that has been authenticated with credentials corresponding to a user account. For example, the request can be a request for an initial license in response to selecting a media content item for playback.

At 220, the DRM license server can transmit a response to the request in accordance with an enforcement mode having particular license parameters. For example, the DRM license server can start each DRM client device with an initial detection-only mode. In continuing this example, in the initial detection-only mode, the DRM license server can set the renewal request interval to five minutes (or any other suitable request interval) and set the license duration to be equivalent to the content duration of the media content item plus x number of minutes (e.g., content duration+x minutes for pause instructions that may be received during the playback of the media content item, etc.). It should be noted that any suitable initial renewal request interval and/or license duration can be provided in this detection-only enforcement mode.

In some implementations, the DRM license server can continue at 230 by accessing and reviewing user account behavior information. For example, in response to receiving a license request or a license renewal request from a user device that has been authenticated with credentials corresponding to a user account and in connection with the DRM license server determine whether to service the request, process 200 can access a license record associated with the user account and determine whether the information in the user account record is indicative of suspicious behavior. Suspicious behavior can include, for example, information indicating the possible or likely suppression of renewal requests by one or more devices associated with the user account. In a more particular example, in response to detecting from the information in the user account record that the user account generates more than a particular number of new license requests across multiple devices and generates no renewal requests within a particular period of time, the DRM license can use such user account behavior information as an indication that renewal requests are being suppressed by the devices associated with the user account and can adjust the license or license renewal parameters.

In some implementations, at 240, the DRM license server can adjust the license or license renewal parameters. For example, in response to detecting the possible suppression of renewal requests (or any other suspicious behavior in connection with the user account), the DRM license server can cause the user account to be placed in a different enforcement mode having adjusted license parameters. Generally speaking, this can be a stricter enforcement mode that includes, for example, a shorter license duration and/or a more frequent renewal request interval.

As shown in FIG. 2, as the DRM license server continues to receive requests from one or more devices associated with the user account, the DRM license can return to 230 and continue to review user account behavior information. As such, in response to continuing to detect the possible suppression of renewal requests (or any other suspicious behavior in connection with the user account), the DRM license server can cause the user account to be placed in yet another enforcement mode having adjusted license parameters—e.g., a strict enforcement mode with a further adjusted license duration and/or a further adjusted renewal request interval.

In some implementations, at 250, the DRM license server can determine whether to modify the current enforcement mode based on the user account behavior information. For example, in response to determining a lesser probability that the devices associated with the user account are suppressing renewal requests or exhibiting suspicious behavior, the DRM license server can modify the enforcement mode or otherwise adjust the license parameters associated with requests from the devices associated with the user account. In a more particular example, the DRM license server can include multiple levels of enforcement and, in response to user account behavior information, the DRM license server can determine whether to increase or decrease the level of enforcement (e.g., between a detection-only enforcement mode to a stricter enforcement mode). In another more particular example, the DRM license server can, in response to detecting that a particular amount of time has passed, reduce the level of enforcement to a less strict enforcement mode. In yet another more particular example, the DRM license server can, in response to detecting that a particular amount of time has passed and that the devices associated with the user account continue to exhibit suspicious behavior, issue licenses or license renewals of zero duration, thereby discontinuing or revoking the usage of the media keys.

Figure 3:
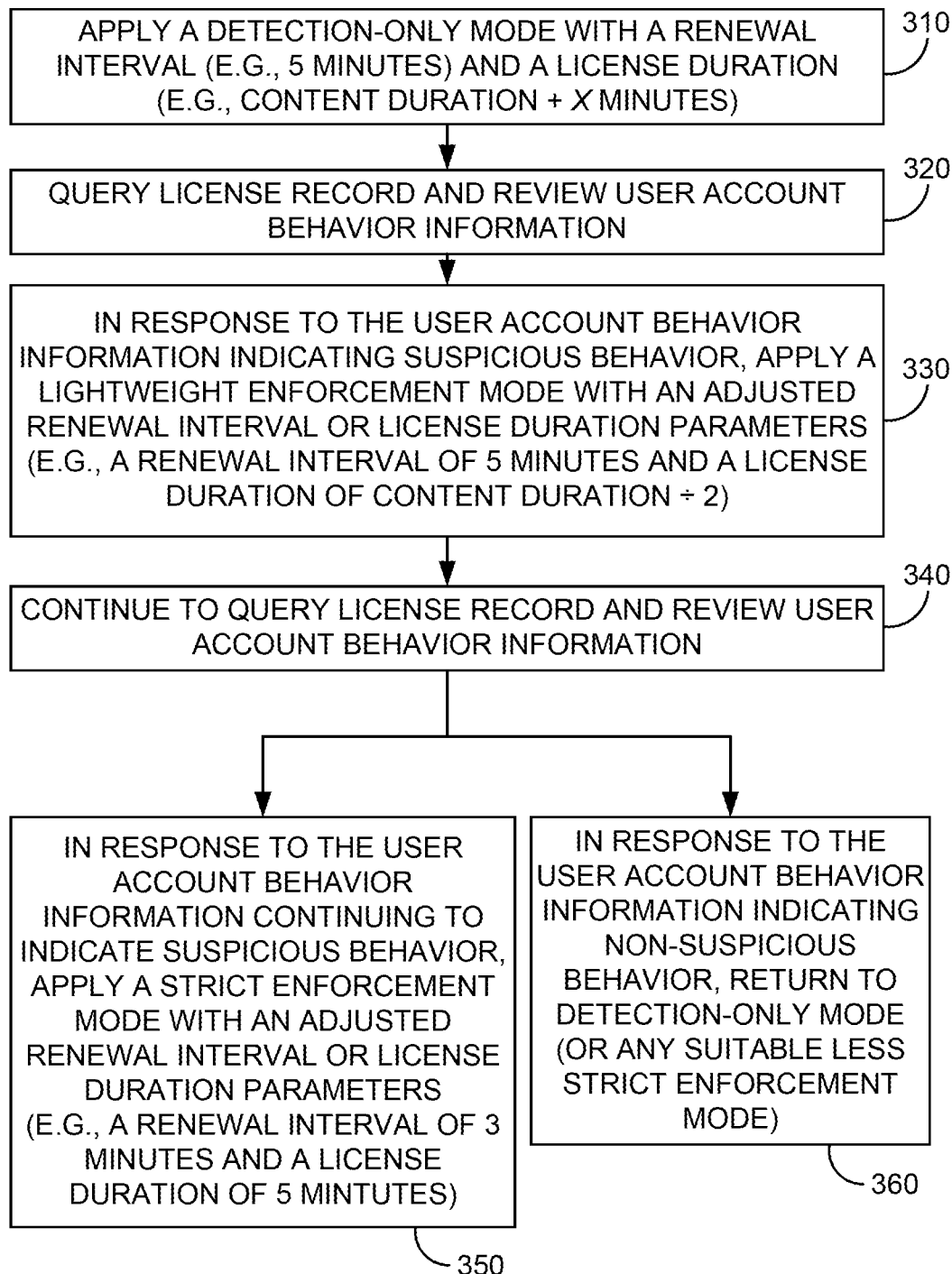
FIG. 3 shows an illustrative example of a process for applying one of multiple enforcement modes to a user account based on user account behavior information in accordance with some implementations of the disclosed subject matter.

An illustrative example of multiple enforcement modes that can be applied is shown in FIG. 3.

As shown, the DRM license server can begin by applying a detection-only mode with a particular renewal interval and a particular license duration at 310. For example, as described above in connection with FIG. 2, the DRM license server can start each DRM client device with an initial detection-only mode. In continuing this example, in the initial detection-only mode, the DRM license server can set the renewal request interval to five minutes (or any other suitable request interval) and set the license duration to be equivalent to the content duration of the media content item plus x number of minutes (e.g., content duration+x minutes for pause instructions that may be received during the playback of the media content item, etc.). It should be noted that any suitable initial renewal request interval and/or license duration can be provided in this detection-only enforcement mode.

During the detection-only mode, the DRM license server can continue to receive requests from user devices associated with a user account and, in response to detecting the possible suppression of renewal requests (or any other suspicious behavior in connection with the user account) by querying a license record and reviewing user account behavior information associated with the user account at 320, a lightweight enforcement mode can be applied that has adjusted renewal interval and/or license duration parameters at 330. For example, in response to reviewing user account behavior information in a license record and detecting that the user account generates more than a particular number of new license requests (e.g., across multiple devices) and no renewal requests within a particular period of time, the DRM license server can use such user account behavior information as an indication that renewal requests are being suppressed and can cause the user account to be placed in a lightweight enforcement mode.

In the lightweight enforcement mode, the DRM license server can modify the renewal request interval and/or the license duration. In continuing the above-mentioned example, the DRM license server can maintain the renewal request interval at five minutes (or any other suitable request interval) and set the license duration to be equal to half of the content duration (content duration÷2). It should be noted that setting the license duration to be equivalent to half of the content duration of the media content item is merely illustrative and any suitable license duration can be set that is less than the content duration of the media content item and/or less than the license duration set in the detection-only mode. In response to the user of the user account suppressing renewal requests, such user account will not be able to consume a piece of media content in its entirety.

During the lightweight enforcement mode, the DRM license server can continue to receive requests from user devices associated with a user account and, in response to detecting the possible suppression of renewal requests (or any other suspicious behavior in connection with the user account) by querying a license record and reviewing user account behavior information associated with the user account at 340. For example, in response to receiving license requests or license renewal requests from devices associated with the user account, the DRM license server can use this opportunity to also review user account behavior information based on the license record.

Referring back to FIG. 3, in response to determining that the user account behavior information continues to indicate that the devices associated with the user account are likely to be involved in suspicious behavior, a strict enforcement mode can be applied with renewal interval or license duration parameters that have been further adjusted at 350. For example, the DRM license server can apply the strict enforcement mode in response to determining that a particular period of time has elapsed and the devices associated with the user account are exhibiting behavior that indicates the devices may be suppressing license renewal requests. In another example, the DRM license server can apply the strict enforcement mode in response to detecting that particular events have been recorded in the license record, such as the receipt of two or more new license requests for the same media content item on the same device or the receipt of a suspicious license renewal request.

In a more particular example, in response to detecting that the user account consistently generates two or more new license requests for the same media content on the same device or in response to receiving a suspicious renewal request from the device (e.g., the time since the last renewal request is close to the license duration instead of the renewal interval of five minutes), the DRM license server can use such information from the license record as an indication that renewal requests are being suppressed and that a reload is being performed halfway through the content (when the license expires). It should be noted that user accounts placed in the lightweight enforcement mode may only be slightly more impacted by server outages as only an extended outage can halt the playback of media content items. It should also be noted that, if suspicious behavior continues, the user account can be placed in a stricter enforcement mode or any other suitable mode that is more restrictive.

In the strict enforcement mode, the DRM license server can further modify the renewal request interval and/or the license duration parameters. In continuing the above-mentioned example, the DRM license server can set the renewal interval to three minutes (or any other suitable request interval) and set the license duration to five minutes (or any other suitable duration). Accordingly, a user of a user account cannot watch more than five minutes of media content at a time if renewal requests are being suppressed. It should be noted that user accounts placed in the strict enforcement mode may only be impacted by server outages of greater than a few minutes (e.g., two minutes).

In some implementations, it should also be noted that, after a particular period of time has elapsed (e.g., a week, two weeks, etc.), the DRM license server can place the user account in a more relaxed mode at 360, such as the lightweight enforcement mode or the detection-only mode described above.

It should be noted that the user experience for user accounts placed in more relaxed enforcement modes may not be impacted and that the impact on server resources may not be impacted as most users generally fall in categories associated with relaxed enforcement modes. It should also be noted that, for non-abusing users, being placed in a more restrictive mode may only negatively affect the user and the user experience if there is a renewal server outage, but, even in such an outage, users can be given long grace periods and suspicious users can reach an alternate server.

Figure 4:
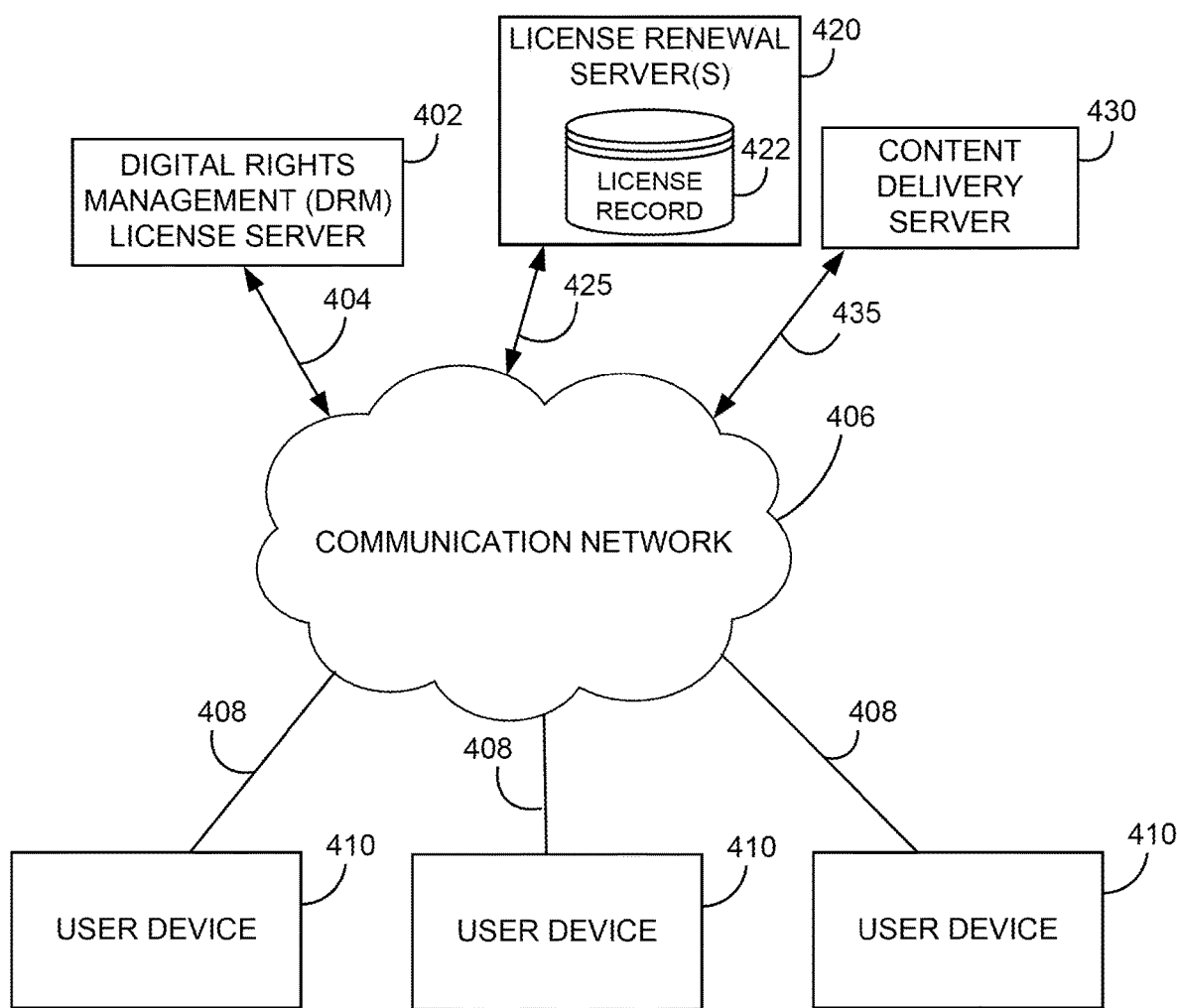
FIG. 4 shows an example of a generalized schematic diagram of a system on which the mechanisms for media session concurrency management with recurring license renewals as described herein can be implemented in accordance with some implementations.

FIG. 4 shows an example 400 of a generalized schematic diagram of a system on which the mechanisms for media session concurrency management with recurring license renewals as described herein can be implemented in accordance with some implementations. As illustrated, system 400 can include one or more user devices 410. User devices 410 can be local to each other or remote from each other. User devices 410 can be connected by one or more communications links 408 to a communications network 406 that can be linked via a communications link 404 to a server, such as digital rights management (DRM) license server 402.

System 400 can include one or more servers 402. Server 402 can be any suitable server for providing access to the mechanisms described herein for media session concurrency management with recurring license renewals, such as a processor, a computer, a data processing device, or any suitable combination of such devices. In some implementations, DRM license server 402, which handles license requests and license renewal requests, can be distributed as any suitable number of servers. For example, as described above and as shown in FIG. 4, the mechanisms for issuing an initial license and issuing license renewals can be distributed into multiple backend components and multiple frontend components and/or interfaces. In a more particular example, a DRM license server 402 can be provided that handles the initial license requests from one or more user devices 410, which may respond with one or more media keys, and one or more license renewal servers 420 can be provided that handle license renewal requests, which may respond with policy data indicating an extension or revocation of the usage of the media keys. In this example, having multiple server devices 402 and 410 may cause the response to license renewal requests to, for example, be faster than responding to initial license requests, which may include the retrieval of media keys and the incorporation of the media keys in the license. This may also allow the one or more license renewal servers 420 that handle license renewals to be detached from the key server or key storage device as well as the user account database. As described hereinbelow, this may further allow system 400 to include multiple servers that handle license renewals (e.g., to provide server reliability and redundancy).

In some implementations, multiple license servers 402 and 420 can be implemented in various locations to increase reliability and/or increase the speed at which the server can communicate with user devices 410 (e.g., the communication of licenses and/or license renewals).

In some implementations, yet another server (or set of servers) can maintain records of licenses and renewal licenses for indicating the number of concurrent sessions.

Although some implementations of license renewals may require that servers 402 and 420 and user devices 410 have a shared knowledge of sessions keys used to authenticate messages, the mechanisms described herein can be implemented to compute such keys so that both the server 402 servicing an initial license request and the server 420 servicing a license renewal request can derive the same session keys and authenticate and sign messages without having to exchange any information between them. Accordingly, if a license server 402 is unable to access the infrastructure required to service an initial license request, the license renewal server 420 can continue to service license renewal requests. In addition, the license servers 402 and/or 420 can be configured to always renew licenses in an emergency mode, such as when the backend infrastructure becomes unavailable, rendering them unable to check concurrency.

In such implementations, existing media playback sessions may not be interrupted when license servers are running and reachable (e.g., even if the original DRM server 402 is unreachable). Accordingly, resiliency can be increased by adding license server redundancy and media playback applications can include multiple URLs for handling license renewal messages or requests. This can, for example, allow media playback applications to be more resilient against server interruptions or failures.

In some implementations, system 400 can be implemented to further increase resiliency by deploying license renewal servers 420 across geographies and infrastructures. This can, for example, increase the probability that license renewal requests are handled in the event a central server or a data center becomes unreachable.

It should be noted that license renewals are generally smaller in size than initial licenses as license renewals contain policy data indicating whether to extend or revoke usage of the media keys (and not the media keys themselves). Because of this, license renewal requests can require fewer resources to service than initial license requests. License renewal servers 420 can then be detached from the key server/store as well as, for example, the main user account database. Accordingly, license renewal servers 420 can be different from the server or servers 402 that service the initial license request. This can, for example, increase the reliability of the overall system 400.

In some implementations of the disclosed subject matter, the concurrency-enforcing system 400 described herein can be implemented to increase reliability of the concurrency-enforcing system using distributed redundancy. Such implementations may be relevant for users of user accounts that are placed in the above-mentioned strict enforcement modes (e.g., as user accounts placed in detection-only or light-weight enforcement modes may not be adversely affected by server outages).

In some implementations, when the license server 402 servicing an initial license request becomes unavailable, initial license requests from the media playback application executing on the user devices 410 will fail (e.g., 503 or other error message). For example, the media playback application can receive an HTTP response code indicating that the license server 402 was unable to provide a response to the license request. In response to detecting the network and/or server failure for a license request message, the media playback application executing on the client device can transmit a request for the license using the URL for a fallback license server 402 (e.g., the next URL from a list of license servers). As mentioned above, the media playback application can access a list having any suitable number of fallback URLs for license servers 402 including, for example, different clusters or a data center across the country, in another country, in another continent, etc. The media playback application can continue to transmit license requests to one or more fallback license servers 402 until a license is received. For example, the media playback application can attempt to reach a particular license server 402 for a particular number of times before progressing to the next license servers 402. In another example, the media playback application can attempt to reach a license server 402 at a particular location for a particular number of times before progressing to a license server 402 at a different location (e.g., when a West Coast-based data center is unavailable, attempt to reach license servers 402 located on the East Coast). It should be noted that, in some implementations, the media playback application can perform these repeated requests until a license server 402 becomes available and a license is received.

In some implementations, when the license renewal server 420 servicing a license renewal request becomes unavailable, license renewal requests from the media playback application executing on user devices 410 will fail (e.g., 503 or other error message). For example, the media playback application can receive an HTTP response code indicating that the license renewal server 420 was unable to provide a response to the license renewal request. In response to detecting the network and/or server failure for a license renewal request message, the media playback application executing on the client device can transmit a request for the license renewal using the URL for a fallback license renewal server 420 (e.g., the next URL from a list of license renewal servers). As mentioned above, the media playback application can access a list having any suitable number of fallback URLs for license renewal servers 420 including, for example, different clusters or a data center across the country, in another country, in another continent, etc. The media playback application can continue to transmit license renewal requests to one or more fallback license renewal servers 420 until a license renewal is received. For example, the media playback application can attempt to reach a particular license renewal server 420 for a particular number of times before progressing to the next license renewal server 420. In another example, the media playback application can attempt to reach a license renewal server 420 at a particular location for a particular number of times before progressing to a license renewal server 420 at a different location (e.g., when a West Coast-based data center is unavailable, attempt to reach license renewal servers located on the East Coast). It should be noted that, in some implementations, the media playback application can perform these attempts to receive a license renewal from a license renewal server 420 while the license duration of the currently active license has not expired.

In some implementations, license server 402 can begin servicing initial license requests by accessing the user database and content key store to fulfill the license request. It should be noted that, if the license server backend is unavailable, the server rejects the license request (e.g., a 500, 503 or other error message is received). License server 402 then can check the record of license requests or concurrent usage (e.g., record 422 in license renewal server 420 or any other suitable server). Similarly, it should be noted that, if the concurrency infrastructure is unavailable, the server may choose to service the request or fail (e.g., a 500, 503 or other error message is received). Based on the concurrency information, license server 402 can reject or service the license request. Alternatively, as described above, license server 402 can be configured to always service new license requests, while flagging an older licenses for discontinuation.

In some implementations, license renewal server 420 can begin servicing license renewal requests by checking a record of renewal requests or concurrent usage, such as license record 422 in license renewal server 420. If the session is flagged for discontinuation, license server 420 can deny the license renewal request or issues a response indicating that playback should be discontinued. Otherwise, license renewal server 420 can issue a license renewal.

In some implementations, if license server 402 or 420 is unable to access the record of renewal requests or concurrent usage or any other suitable information used to determine whether a license renewal should be issued (e.g., record 422), license server 402 or 420 can determine whether an emergency renewal mode should be entered. For example, in response to a number of failed attempts to access the record from a backend server component being greater than a given threshold value, license server 402 or 420 can determine that the server should enter an emergency renewal mode, where such a detection can be logged, alerts can be triggered, etc. In emergency renewal mode, license server 420 can automatically renewal all valid licenses. In some implementations of emergency renewal mode, the license duration and/or the renewal request interval can be increased (e.g., to alleviate renewal messages to the server during a server outage or server overload).

Referring back to FIG. 4, other servers can be included in system 400. For example, content delivery server 430 can receive requests to present a media content item and provide the media content item (e.g., in an encrypted form requiring keys from DRM license server 402 or any other suitable server to decrypt the media data). In another example, content delivery server 430 can provide metadata or other information corresponding to media content being displayed by user device 410.

Generally, user devices 410 can include any computing device capable of receiving and sending messages over a network, accessing and/or playing content, such as network 406, or the like. Further, user devices 410 can include any computing device capable of connecting to another computing device and receiving information such as, a laptop computer, a smart phone, a tablet computers, and the like. However, computing devices are not so limited and may also include other devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, user devices 410 typically range widely in terms of capabilities and features.

In some implementations, a web-enabled user device 410 can include a browser application that is configured to receive and to send web pages, web-based messages, and the like. The browser application can be configured to receive and display graphics, text, multimedia, media content, and the like, employing virtually any Internet-based and/or network-based protocol, including but not limited to a wireless application protocol messages ("WAP"), Hypertext Transfer Protocol ("HTTP"), or the like. In one implementation, the browser application is enabled to employ Handheld Device Markup Language ("HDML"), Wireless Markup Language ("WML"), WMLScript, JavaScript, Standard Generalized Markup Language ("SGML"), HyperText Markup Audio Language ("HTML"), eXtensible Markup Language ("XML"), and the like, to display and send a message. In one implementation, a user of a client user can employ the browser application to perform various activities over a network (online). However, another application can also be used to perform various online activities.

User devices 410 also can include at least one other client application that is configured to receive and/or send content between another computing device. The client application can include a capability to send and/or receive content, or the like. The client application can further provide information that identifies itself, including a type, capability, name, and the like. In one implementation, user devices 410 can identify themselves as part of a class of devices. In another implementation, user devices 410 can uniquely identify themselves through any of a variety of mechanisms, including a phone number, Mobile Identification Number ("MIN"), an electronic serial number ("ESN"), Internet Protocol (IP) Address, network address, or other mobile device identifier. The information can also indicate a content format that the mobile device is enabled to employ. Such information may be provided in a network packet, or the like, sent between other client devices or other computing devices. Moreover, it should be readily understood that devices and/or components within a device that is communicating with a client device can also identify themselves using any of a variety of mechanisms, including those used by the client device.

User devices 410 can further be configured to include a client application that enables a user to log into a user account that may be managed by another computing device. Such user accounts, in one non-limiting example, can be configured to enable the user to manage one or more online activities, including in one non-limiting example, search activities, social networking activities, browse various websites, communicate with other users, or the like. In one implementation, the user's client device can receive content streamed to the client device for playback at the client device. However, participation in online activities can also be performed without logging into the user account.

In some implementations, each of the user devices 410 and servers 402, 420, and 430 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 410 can be implemented as a smartphone having a camera, a tablet computer having a camera, a wearable computer having a camera, a camera device that interfaces with a smartphone (e.g., a camera dongle for a smartphone), a digital camera (e.g., a point and shoot camera, a DSLR camera, a digital camcorder, etc.), an analog camcorder, a personal computer, a laptop computer, a smartphone, a tablet computer, a gaming device, a digital media receiver, a set-top box, a smart television, a server, etc.

Communications network 406 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 404, 408, 425, and 435 can be any communications links suitable for communicating data among user devices 410 and servers 402, 420, and 430, such as network links, dial-up links, wireless links, hard-wired links, any other suitable communications links, or any suitable combination of such links. User device 410 can also be used to present videos from content delivery server 430 or from any other suitable source (e.g., a hard drive, cloud storage, a flash drive, etc.) to a viewer. User devices 410 and servers 402, 420, and 430 can be located at any suitable location.

Figure 5:
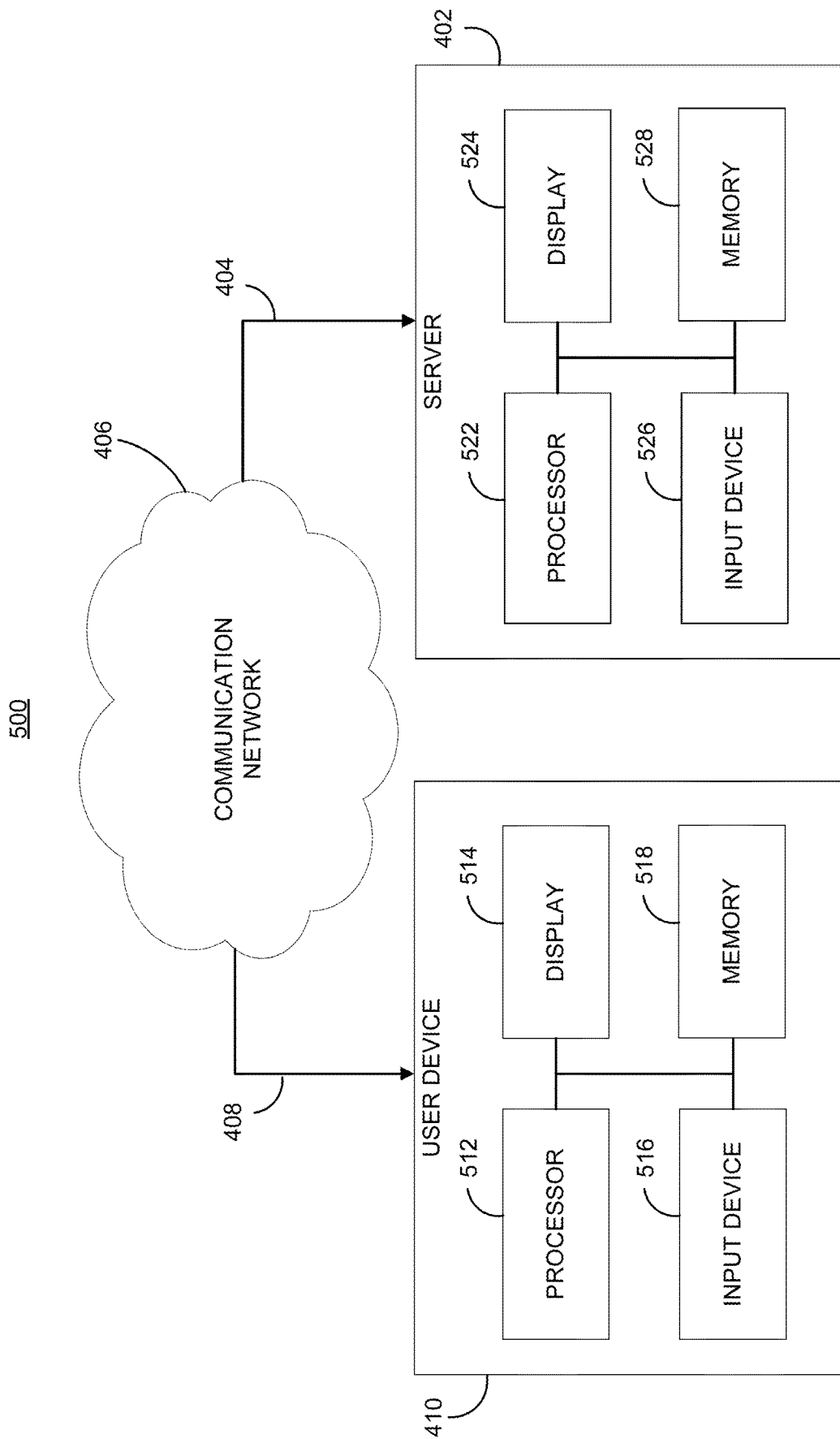
FIG. 5 shows an example of hardware that can be used to implement one or more computing devices and servers depicted in FIG. 4 in accordance with some implementations of the disclosed subject matter.

FIG. 5 illustrates an example 500 of hardware that can be used to implement server 402 (or server 420 or 430) and one of user devices 410 depicted in FIG. 4 in accordance with some implementations of the disclosed subject matter. Referring to FIG. 5, user device 410 can include a hardware processor 512, a display 514, an input device 516, and memory 518, which can be interconnected. In some implementations, memory 518 can include a storage device (such as a non-transitory computer-readable medium) for storing a computer program for controlling hardware processor 512.

Hardware processor 512 can use the computer program to present on display 514 content and/or an interface that allows a user to, among other things, cause a video to be retrieved from server 430, interact with the media playback application, interact with the mechanisms described herein for resource management with recurring license renewals being executed by a device, such as DRM license server 402 or license renewal server 420, and to send and receive data through communications link 408. It should also be noted that data received through communications link 408 or any other communications links can be received from any suitable source. In some implementations, hardware processor 512 can send and receive data through communications link 408 or any other communication links using, for example, a transmitter, receiver, transmitter/receiver, transceiver, or any other suitable communication device. Display 514 can be a flat panel display, a cathode ray tube display, a projector, a touch screen, a speaker(s), and/or any other suitable display and/or presentation devices. Input device 516 can be a computer keyboard, a computer mouse, a microphone, a touchpad, a voice recognition circuit, a touchscreen, and/or any other suitable input device.

Server 402 (or servers 420 or 430) can include a hardware processor 522, a display 524, an input device 526, and memory 528, which can be interconnected. In some implementations, memory 228 can include a storage device for storing data received through communications link 104 or through other links. The storage device can further include a server program for controlling hardware processor 222.

Hardware processor 522 can use the server program to communicate with user devices 412. It should also be noted that data received through communications link 404 or any other communications links can be received from any suitable source. In some implementations, hardware processor 522 can send and receive data through communications link 404 or any other communication links using, for example, a transmitter, receiver, transmitter/receiver, transceiver, or any other suitable communication device. In some implementations, hardware processor 522 can receive commands and/or values transmitted by one or more users. Display 524 can be a flat panel display, a cathode ray tube display, a projector, a touch screen, a speaker(s), and/or any other suitable display and/or presentation devices. Input device 526 can be a computer keyboard, a computer mouse, a microphone, a touchpad, a voice recognition circuit, a touchscreen, and/or any other suitable input device.

In one particular implementation, the mechanisms described herein can include server-side software, server-side hardware, client-side software, client-side hardware, or any suitable combination thereof. For example, the media playback application can encompass a computer program written in a programming language recognizable by server 402 executing the editing application (e.g., a program written in a programming language, such as, Java, C, Objective-C, C++, C#, JavaScript, Visual Basic, or any other suitable approaches). As another example, the media playback application can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

Accordingly, systems, methods, and media for media session concurrency management with recurring license renewals are provided.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes can be executed or performed in any order or sequence not limited to the order and sequence shown and described in the figures. Also, some of the above steps of the processes can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A system for concurrency detection and enforcement, the system comprising:
at least one server including a hardware processor that is configured to:
receive a request for a media content license pertaining to a media content item to be presented on a media device; and
responsive to the request, transmit, to the media device, one or more keys associated with the media content item and a license comprising a policy including a limited license duration and a renewal request interval.

2. The system of claim 1, wherein the hardware processor is further configured to:
receive, at a time within the renewal request interval, a request for a license renewal pertaining to the media content item being presented on the media device;
determine whether to issue the license renewal for the media content item based on media session concurrency across a plurality of media devices associated with a user account; and
transmit the license renewal to the media device.

3. The system of claim 1, wherein the request for the media content license is associated with a user account.

4. The system of claim 3, wherein the determination includes querying a record of license renewals issued during a given time period for the user account and wherein the license renewal is transmitted based on the record of license renewals associated with the user account.

5. The system of claim 4, wherein the hardware processor is further configured to modify at least one of the limited license duration and the renewal request interval.

6. The system of claim 5, wherein the modification is performed in response to reviewing the record of license renewals issued during the given time period for the user account and determining that the record of license renewals indicates suppression of license renewal requests by a plurality of media devices associated with the user account.

7. The system of claim 5, wherein the modification is performed in response to detecting a server outage.

8. The system of claim 1, wherein the hardware processor is further configured to:
determine whether the one or more keys in the license are to revoked; and
in response to determining that the one or more keys in the license are to be revoked, set the limited license duration associated with the license renewal to a zero duration.

9. The system of claim 1, wherein the hardware processor is further configured to automatically transmit the license of the limited license duration for the media content item to the media device while concurrently indicating a previously issued license within a record for discontinuation.

10. The system of claim 1, wherein the hardware processor is further configured to:
review a record of license renewals issued during a given time period for a user account;
determine an enforcement mode from a plurality of enforcement modes to apply to the user account; and
apply the determined enforcement mode when issuing the license renewal, wherein at least one of the limited license duration and the renewal request interval is adjusted.

11. The system of claim 1, wherein the hardware processor is further configured to transmit, to a media playback application executing on the media device, a list of a plurality of license servers for handling the request for the license renewal, wherein the media playback application transmits the request for the license renewal to a first license server of the plurality of license servers and, upon detecting that the first license server is unavailable and prior to the expiration of the license, transmits the request to a second license server of the plurality of license servers until the license renewal for the media content license is received.

12. The system of claim 1, wherein the hardware processor is further configured to:
determine whether to issue the license renewal by counting the number of license renewals associated with a user account within a given time period; and
transmit the license renewal to the media device based on the count.

13. The system of claim 1, wherein the hardware processor is further configured to:
determine that a record of license renewals is inaccessible in response to querying the record of license renewals; and
enter an emergency renewal mode that automatically issues the license renewal in response to determining that the record of license renewals is inaccessible.

14. A method for concurrency detection and enforcement, the method comprising:
receiving a request for a media content license pertaining to a media content item to be presented on a media device; and
responsive to the request, transmitting, to the media device, one or more keys associated with the media content item and a license comprising a policy including a limited license duration and a renewal request interval.

15. The method of claim 14, further comprising:
receiving, at a time within the renewal request interval, a request for a license renewal pertaining to the media content item being presented on the media device;
determining whether to issue the license renewal for the media content item based on media session concurrency across a plurality of media devices associated with a user account; and
transmit the license renewal to the media device.

16. The method of claim 14, wherein the request for the media content license is associated with a user account.

17. The method of claim 16, wherein the determination includes querying a record of license renewals issued during a given time period for the user account and wherein the license renewal is transmitted based on the record of license renewals associated with the user account.

18. The method of claim 17, further comprising modifying at least one of the limited license duration and the renewal request interval.

19. The method of claim 18, wherein the modification is performed in response to reviewing the record of license renewals issued during the given time period for the user account and determining that the record of license renewals indicates suppression of license renewal requests by a plurality of media devices associated with the user account.

20. The method of claim 18, wherein the modification is performed in response to detecting a server outage.

21. The method of claim 14, further comprising:
determining whether the one or more keys in the license are to revoked; and
in response to determining that the one or more keys in the license are to be revoked, setting the limited license duration associated with the license renewal to a zero duration.

22. The method of claim 14, further comprising automatically transmitting the license of the limited license duration for the media content item to the media device while concurrently indicating a previously issued license within a record for discontinuation.

23. The method of claim 14, further comprising:
reviewing a record of license renewals issued during a given time period for a user account;
determining an enforcement mode from a plurality of enforcement modes to apply to the user account; and
applying the determined enforcement mode when issuing the license renewal, wherein at least one of the limited license duration and the renewal request interval is adjusted.

24. The method of claim 14, further comprising transmitting, to a media playback application executing on the media device, a list of a plurality of license servers for handling the request for the license renewal, wherein the media playback application transmits the request for the license renewal to a first license server of the plurality of license servers and, upon detecting that the first license server is unavailable and prior to the expiration of the license, transmits the request to a second license server of the plurality of license servers until the license renewal for the media content license is received.

25. The method of claim 14, further comprising:
determining whether to issue the license renewal by counting the number of license renewals associated with a user account within a given time period; and
transmitting the license renewal to the media device based on the count.

26. The method of claim 14, further comprising:
determining that a record of license renewals is inaccessible in response to querying the record of license renewals; and
entering an emergency renewal mode that automatically issues the license renewal in response to determining that the record of license renewals is inaccessible.

27. A non-transitory computer-readable medium containing computer executable instructions that, when executed by a processor, cause the processor to perform a method for concurrency detection and enforcement, the method comprising:
receiving a request for a media content license pertaining to a media content item to be presented on a media device; and
responsive to the request, transmitting, to the media device, one or more keys associated with the media content item and a license comprising a policy including a limited license duration and a renewal request interval.

* * * * *